United States Patent Office 3,029,292
Patented Apr. 10, 1962

3,029,292
PHENOL PURIFICATION
Joseph R. Nixon, Jr., Pitman, N.J., assignor to Hercules Powder Company, Wilmington, Del., a corporation of Delaware
No Drawing. Filed Aug. 19, 1960, Ser. No. 50,579
8 Claims. (Cl. 260—621)

This invention relates to the purification of phenol, and more particularly to the purification of phenol obtained by oxidation of cumene and subsequent cleavage of the hydroperoxide produced.

When cumene hydroperoxide is cleaved by contacting it with acidic catalysts such as sulfuric acid and acid-treated clays, the cleavage mixture contains phenol and acetone as the principal products. However, the mixture also contains α-methylstyrene, acetophenone, dimethylphenylcarbinol and cumylphenol as byproducts, and it may contain some unreacted cumene.

The components of the cleavage mixture are preferably recovered therefrom by fractional distillation. Fundamentally, the distillation results in obtaining an acetone fraction, a phenol fraction and a residue comprising cumylphenol. In more detail, the distillation may be carried out to obtain a first fraction comprising acetone, a second fraction comprising α-methylstyrene, any unreacted cumene, if present, and water, a third fraction comprising phenol, and a residue comprising acetophenone, dimethylphenylcarbinol, cumylphenol and some resinous matter formed by polymerization of α-methylstyrene. Alternatively, the cumene and α-methylstyrene may be collected with the acetone fraction or the phenol fraction and separated therefrom by subsequent distillation. In any event, the phenol fraction is a crude phenol which must be subjected to further distillation for purification purposes.

The distillation procedures described above may be operated batchwise, but are more conveniently carried out on a continuous basis in a series of columns, the various fractions being obtained as overhead materials. The crude phenol fraction so obtained may then be distilled either continuously or in a batchwise operation to purify it. When operating batchwise, the crude phenol is stored and periodically removed from the storage tank for charging to the batch still.

Early in the development of suitable distillation techniques for the isolation of pure phenol from cumene hydroperoxide cleavage mixtures it was found that the product phenol, although otherwise pure and meeting standard specifications, contained certain genetic impurities which were usually present in only minute amounts, but which were of such a nature that the phenol containing them developed an undesired red color when subjected to chlorination with elementary chlorine and also developed an unwanted reddish amber color when sulfonated with concentrated sulfuric acid. These impurities obviously were not separable from the phenol by ordinary fractional distillation, and their presence effectively prevented complete purification of the phenol by this procedure alone.

The nature of the genetic impurities is now known, and a process of purifying phenol containing them has been discovered. The genetic impurities include mesityl oxide, compounds which are α-diketones, such as biacetyl, compounds which are partial hydrogenation products of α-diketones or α-ketoaldehydes, such as acetoin and hydroxy-acetone, and compounds which are alkyl-substituted benzofurans such as 2-methylbenzofuran. The process is one comprising the particular steps of contacting a phenol, containing the genetic impurities, in the liquid phase with certain acidic catalysts at a temperature in the range of about 45° to about 200° C., fractionally steam distilling the treated phenol and subsequently collecting a phenol material which may or may not be the product phenol but which will be a phenol material purified to the extent of substantial removal of the genetic impurities.

Of the specific impurities listed above, mesityl oxide and biacetyl were the first to be identified, and they were found to be inseparable from phenol by ordinary fractional distillation. Identification of the 2-methylbenzofuran impurity was next and was difficult, but after the identification had been accomplished, several additional findings were made, namely, that the compound could not be separated from phenol by ordinary fractional distillation, that it was steam-volatile and separable from phenol by fractional steam distillation, and that it was formed by reaction between phenol and biacetyl, one of the previously known genetic impurities. Before the method of formation of 2-methylbenzofuran had been established, it had been found in accordance with the present invention that the process resulted in formation of additional amounts of 2-methylbenzofuran and that the total could be removed by fractional steam distillation. Furthermore, it was found that biacetyl was not the only precursor to 2-methylbenzofuran, and it also became apparent that there were other alkyl-substituted benzofurans, the alkyl substituents being in the furan ring, which should give rise to undesirable coloration on chlorination of phenol obtained by cumene hydroperoxide cleavage.

The overall findings may now be generalized. Discoloration on chlorination of cumene hydroperoxide phenol occurs primarily due to the presence therein of one or more alkyl-substituted benzofurans, such as 2-methyl-, 3-methyl- and 2-isopropyl-benzofuran. The alkyl-substituted benzofurans are those compounds which are benzofuran substituted by one alkyl substituent in the furan ring, either at the 2- or 3- position. The alkyl group will contain between one and about nine carbon atoms. Ordinarily, six carbon atoms will be a maximum, and most of the substituted benzofurans will contain either one-carbon or three-carbon alkyl substituents. Nevertheless, discoloration also is contributed to by mesityl oxide and one or more of the precursors of the alkyl-substituted benzofurans. These precursors are compounds such as biacetyl, hydroxyacetone, 4-methyl-2,3-pentanedione, and acetoin. In turn, the hydroxyacetone may be formed by partial hydrogenation of methylglyoxal, which is an α-ketoaldehyde, and the 4-methyl-2,3-pentanedione may be formed by hydrogenation of the carbon-carbon double bond in mesityl oxide and oxidation of the resulting methyl isobutyl ketone. Similarly, the acetoin may be formed by partial hydrogenation of biacetyl, which is an α-diketone. The α-diketones and the partial hydrogenation products thereof and of α-ketoaldehydes are all comparatively low molecular weight compounds containing no more than about twelve, and usually no more than about nine, carbon atoms. The α-diketone and α-ketoaldehyde partial hydrogenation products are those wherein one of the keto groups in the diketones and the aldehyde group in the ketoaldehydes have been reduced to the corresponding alcohol groups, thus giving α-ketoalcohols as products.

Accordingly, it is now apparent that the inventive process is one wherein the prescribed catalysts promote substantially complete reaction between phenol and the alkyl-substituted benzofuran precursors and wherein the total alkyl-substituted benzofuran content is removed by efficient fractional steam distillation.

The purification process of this invention therefore constitutes an improvement in the method for the recovery of phenol by fractional distillation from the mixture produced by cleavage of cumene hydroperoxide, which mixture comprises acetone and phenol as principal components. The improvement comprises the steps of subjecting a cumene hydroperoxide cleavage mixture, from which the acidic catalyst has been substantially removed, as by neutralization or extraction, to fractional distillation to remove acetone and then contacting in the liquid phase any substantially acetone-free, predominantly phenol-containing material, which material contains genetic impurities comprising mesityl oxide, an alkyl-substituted benzofuran and at least one precursor of said alkyl-substituted benzofuran, under acidic conditions with an acidic catalyst selected from the group consisting of boron trifluoride and the halides, sulfates and nitrates of platinum and those heavy metals of groups II B, III A, IV, V A and VIII of the periodic table having an atomic number less than 52, at a temperature in the range of about 45° to about 200° C., fractionally steam distilling the treated phenol-containing material, and subsequently collecting a purified phenol-containing material, preferably by fractonally distilling in the absence of water.

In other words, the improvement of this invention involves treatment with the prescribed catalysts of any predominantly phenol-containing material existing in the distillative recovery system after the acetone has been removed from the cleavage mixture, which itself is not effectively improved by the treatment. The predominantly phenol-containing material may be illustrated by the bottoms product from removal of acetone from the cleavage mixture, by the overhead crude phenol separated from higher boiling materials such as acetophenone and cumylphenol, by the bottoms product from steam distillation of a crude phenol, by the phenol stored prior to final batch distillation, and by the final product phenol isolated by batch or continuous distillation. These are all descriptive of materials obtainable in a substantially continuous distillation system, involving a series of columns, but comparable or related materials obtained by batchwise fractionation also may be treated. All of these materials may be defined as impure phenols to the extent that they contain genetic impurities as hereinbefore described. The purification process preferably comprises heating the impure phenol with the prescribed catalyst until the precursor-type genetic impurities have been completely reacted with the phenol and converted to alkyl-substituted benzofurans, and fractionally distilling, first with steam to remove the alkyl-substituted benzofurans as overhead, and then in the absence of water to collect a purified phenol-containing material.

The process in accordance with this invention is more particularly described in the following examples. In this specification all parts and percentages are by weight.

EXAMPLE 1

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns. In the first column acetone was taken overhead, leaving as bottoms product a mixture of phenol, some cumene and α-methylstyrene, and high boiling material composed primarily of acetophenone, dimethylphenylcarbinol and cumylphenol. This bottoms product was separated in the next column into an overhead crude phenol fraction and a high boiling residue. The crude phenol fraction was then subjected to steam distillation in a third column to remove overhead azeotropes of water with α-methylstyrene and cumene, and leave a crude phenol bottoms product. This product was then stored in a steel container.

The stored phenol contained 41 parts per million of 2-methylbenzofuran (2-MBF), as determined by ultraviolet analysis, and to it was added 0.5% by weight of ferric chloride. The resulting mixture had a pH of 2.8 and was maintained at 120° C. for 70 hours, after which the 2-MBF content was 268 p.p.m.

A sample of the treated phenol was separated into two portions, one of which was subjected to ordinary batch distillation, with the charge being added to the still pot. The other portion was fractionally steam distilled using a modified inverted batch still technique, in which distilled water was charged to the still pot and brought to reflux, and then the treated phenol was pumped continuously into the top of the still while maintaining water reflux. Thus, all of the phenol was contacted with steam as it flowed down and across all of the trays of the column. After all the charge had been added, distillation was carried out in the normal manner.

The phenol obtained from each distillation was chlorinated according to the chlorination test set forth hereinafter. The phenol from ordinary distillation had a color of 12 absorbance units at 540 Mµ, whereas that from steam distillation contained 8 p.p.m. 2-MBF and had a color of 0.33 at 510 mµ and 0.4 at 540 mµ.

EXAMPLE 2

The procedure of Example 1 was substantially duplicated except that after about five hours of reaction in the presence of the ferric chloride there was added to the reaction mixture sufficient sodium hydroxide to adjust the pH of the mixture to 6.7. Subsequent periodic sampling of the mixture to determine 2-MBF content showed that 2-MBF was formed only at a very slow rate, and the reaction was terminated after 46 hours, at which time the 2-MBF content was 79 p.p.m. This example establishes the need for acidic conditions during the catalytic treatment.

EXAMPLE 3

A neutralized cumene hydroperoxide cleavage mixture was distilled as in Example 1 to obtain an acetone fraction, an overhead crude phenol fraction (A) and a crude phenol bottoms product (B) from steam distillation of (A). Product (B) was transferred to a steel container for storage, and the stored phenol was distilled batchwise to recover product phenol (C).

The crude phenol fraction (A) was heated at 120° C. for 51 hours in the presence of 0.5% ferric chloride, after which the treated phenol was steam distilled and the phenol collected as described in Example 1. The phenol on chlorination had a color of 0.99 absorbance unit at 510 mµ and 1.0 absorbance unit at 540 mµ.

Repetition of the above procedure except to use a reaction temperature of 105° C. and a time of 91 hours gave a distilled phenol containing 100 p.p.m. 2-MBF and a color on chlorination of 5.5 absorbance units at 540 mµ.

EXAMPLE 4

The procedure of Example 3 was substantially repeated, using a reaction temperature of 180° C. and a reaction time of 49 hours, on the crude phenol fraction (A) which had first been dehydrated by heating at 180° C. The distilled product contained 10–12 p.p.m. of 2-MBF and on chlorination had a color of 0.7 absorbance unit at 510 mµ and 0.61 absorbance unit at 540 mµ.

EXAMPLE 5

The crude phenol fraction (A) of Example 3 was dehydrated at 180° C. and then fractionally steam distilled using the technique described in Example 1. The resulting phenol then was contacted with 0.5% ferric chloride at 120° C. for 44.5 hours. The treated phenol contained 367 p.p.m. 2-MBF and was steam distilled as in Example 1. The phenol then contained 12 p.p.m. 2-MBF. This shows that fractional steam distillation is necessary subsequent to the catalytic treatment. It also shows that fractional steam distillation alone is insufficient to purify the phenol, since the first such distillation, which essentially removed the 2-MBF then existing, when followed by the catalytic treatment resulted in formation of an additional amount of 2-MBF.

EXAMPLE 6

When the phenol products from Examples 3 and 4 were combined and subjected to additional treatment with 0.5% ferric chloride at 120° C. for 90 hours, it was found that there was no increase in 2-MBF content, thus establishing the effectiveness of the original treatments in catalyzing the reaction of phenol with 2-MBF precursors. The particular Example 3 product used was that obtained from the treatment at 120° C.

EXAMPLE 7

Using a sample of another crude phenol fraction material similar to (A) in Example 3, it was contacted with 1.5% aluminum chloride for 0.5 hour at 150° C. After steam distilling as shown in Example 1, the distilled phenol on chlorination exhibited satisfactory color. The same was found to be true with substitution of 0.7% ferric chloride for the aluminum chloride.

EXAMPLE 8

The crude phenol bottoms product (B) of Example 3 was heated at 108° C. for 75 hours in the presence of 0.5% ferric chloride. The treated product had a 2-MBF content of 282 p.p.m. and was fractionally steam distilled using the technique described in Example 1. The distilled phenol contained 10 p.p.m. 2-MBF and on chlorination had a color of 0.5 absorbance unit at 540 m$\mu$.

EXAMPLE 9

The crude phenol bottoms product (B) of Example 3 again was utilized, this time being contacted with 0.3% ferric sulfate at 120° C. for 91 hours. The treated phenol contained 525 p.p.m. 2-MBF and after steam distillation as shown in Example 1, the distilled product contained 65 p.p.m. 2-MBF. On chlorination, the product exhibited a color of 3.6 absorbance units at 510 m$\mu$ and 5.3 absorbance units at 540 m$\mu$.

Repetition of this example except to use 0.6% ferric sulfate, 108° C. and 143 hours, gave a treated phenol having a 2-MBF content of 256 p.p.m.

EXAMPLE 10

To a sample of a stored phenol such as that used in Example 1 were added 0.5% of nickel chloride and sufficient hydrochloric acid to bring the pH of the mixture to 2.0. The mixture was heated at 120° C. for 91 hours, at which time the 2-MBF content was 178 p.p.m. After steam distillation as described in Example 1, the distilled product contained 10 p.p.m. 2-MBF and gave a chlorination color of 0.6 absorbance unit at 540 m$\mu$.

Substitution of 0.5% nickel sulfate for the nickel chloride gave a treated product containing 171 p.p.m. of 2-MBF. After steam distillation the distilled product contained 10 p.p.m. 2-MBF and had a chlorination color of 0.6 absorbance unit at 540 m$\mu$.

EXAMPLE 11

The product phenol (C) from Example 3 was subjected to contact with 0.5% ferric chloride at 120° C. for 71 hours and was then found to contain 34 p.p.m. 2-MBF. After fractional steam distillation as described in Example 1, the 2-MBF content was 10 p.p.m. The distilled phenol on chlorination gave a color of 0.13 absorbance unit at both 510 m$\mu$ and 540 m$\mu$.

EXAMPLE 12

The phenol used in this example was a crude phenol bottoms product obtained by the general procedure described in the first paragraph under Example 1, but which had not been stored. It contained about 10 p.p.m. of 2-methylbenzofuran (2-MBF). The phenol was charged to a reaction vessel fitted with a condenser and a thermowell, and to the phenol was added 0.5% by weight of palladium chloride. The resulting mixture was heated to 120° C. and maintained at that temperature for 29.5 hours, after which the 2-MBF content was 260 p.p.m.

The treated phenol was then fractionally steam distilled using the modified inverted batch still technique described in Example 1. Distilled water was charged to the still pot and the still was placed on total reflux. While refluxing water, the treated phenol was pumped into the top of the still. After the still was charged, the charge was dehydrated and then was distilled at 200 mm. Hg absolute using a reflux ratio of 3 to 1.

A sample of the distilled phenol was analyzed for 2-MBF content and was chlorinated. The phenol contained 12 p.p.m. 2-MBF and had a color of 0.23 at 510 m$\mu$ and 0.29 at 540 m$\mu$.

EXAMPLE 13

The procedure of Example 12 was followed except to substitute 0.4% by weight of platinum chloride for the palladium chloride. After 54.5 hours of heating in the presence of the catalyst, the phenol contained 227 p.p.m. of 2-MBF. After being fractionally steam distilled and then further distilled under reduced pressure, a sample of the phenol analyzed for 14.5 p.p.m. of 2-MBF and upon chlorination exhibited a color of 0.38 at 510 m$\mu$ and 0.55 at 540 m$\mu$.

EXAMPLE 14

In this example 0.5% by weight of ferric nitrate was substituted for the palladium chloride of Example 12. The distilled phenol product upon analysis was found to contain no detectable amount of 2-MBF, and when chlorinated gave a color of 0.06 at 510 m$\mu$ and 0.08 at 540 m$\mu$.

The effect of 2-methylbenzofuran, biacetyl and mesityl oxide upon the color of phenol which has been chlorinated is shown in the next example.

EXAMPLE 15

To samples of substantially pure phenol (Merck) were added varying amounts of mesityl oxide, biacetyl and 2-methylbenzofuran (2-MBF), and the resulting mixtures were chlorinated according to the chlorination test set forth hereinafter. A sample of the pure phenol was similarly chlorinated for comparative purposes. The data obtained are given in the following table.

*Table*

| Sample | Color on Chlorination Absorbance | |
|---|---|---|
| | 510 m$\mu$ | 540 m$\mu$ |
| Phenol | 0.28 | 0.10 |
| Phenol + 0.1% Mesityl Oxide | 1.2 | |
| Phenol + 0.2% Mesityl Oxide | 2.8 | |
| Phenol + 0.1% Biacetyl | 11.7 | |
| Phenol + 0.016% 2-MBF | | 7.3 |
| Phenol + 0.018% 2-MBF | | 9.7 |
| Phenol + 0.022% 2-MBF | | 12.6 |
| Phenol + 0.028% 2-MBF | | 14.8 |
| Phenol + 0.034% 2-MBF | | 15.8 |
| Phenol + 0.05% 2-MBF | | 22.8 |

The above data establish that each of the impurities has a profound effect on the color of chlorinated phenol. Both mesityl oxide and biacetyl cause a bright red coloration with a characteristic absorption at 510 m$\mu$. 2-Methylbenzofuran is responsible for a reddish purple color with absorption at 540 m$\mu$, and it and biacetyl are relatively potent color-formers, imparting intense coloration in low concentrations. By comparison, mesityl oxide causes considerably less coloration.

The effect of applying the process of this invention to any particular batch of phenol may be followed by using the following color tests for determining whether the precursor-type and alkyl-substituted benzofuran genetic impurities have been removed. Biacetyl gives a red color when the phenol is subjected to chlorination in the chlorination color test and gives a reddish amber color when the phenol is sulfonated in the sulfonation color test. 2-Methylbenzofuran gives a reddish purple color when the phenol is chlorinated in the chlorination color test.

*Chlorination Color Test.*—10±0.1 g. phenol to be tested is placed in a chlorination vessel comprising a 25 mm. test tube fitted with a gas inlet tube extending to the bottom of the test tube, a gas outlet tube opening from the upper end of the test tube, and a glass stopper for introduction of the phenol. Chlorine gas is introduced through the gas inlet tube at a rate of one liter per minute while maintaining a reaction temperature at 80°±5° C. by cooling of the chlorination vessel. The chlorination vessel is weighed from time to time and chlorination is stopped when a gain in weight of 5.5–6.0 grams is noted. The chlorinated product is then transferred to a 1 cm. cell and subjected to analysis by a recording spectrophotometer. The absorption at 510 and 540 m$\mu$ is noted for test purposes and the position of maximum absorption is also noted. Absorbance is a measurement of the intensity of absorption and is defined as the log of the reciprocal of the transmittance. The color of the chlorinated phenol in a 1 cm. cell is alternatively analyzed by Lovibond color units.

*Sulfonation Color Test.*—10±0.1 g. phenol to be tested is placed in a sulfonation vessel and heated until molten. To the phenol is added 5 g. of concentrated sulfuric acid, and the resulting mixture is heated with stirring to 150° C. and held at that temperature for 5 minutes. The sulfonated phenol is then cooled and transferred to a 1 cm. cell and subjected to analysis by a recording spectrophotometer. The absorption at 485 m$\mu$ is noted for test purposes.

The process of this invention involves reaction between phenol and the alkyl-substituted benzofuran precursors to form alkyl-substituted benzofurans, and separation of the latter from the reaction mixture by efficient fractional steam distillation. The acidic catalysts which will effect the desired reaction are boron trifluoride and the halides, sulfates and nitrates of platinum and those heavy metals of groups II B, III A, IV, V A and VIII of the periodic table having an atomic number less than 52. Of the aforementioned metal halides the preferred ones are well recognized as constituting a definite class of compounds (N. O. Calloway, Chem. Rev. 17, 327–392 (1935)). They include aluminum chloride, aluminum bromide, antimony pentachloride, antimony trichloride, ferric chloride, stannic chloride, titanium trichloride, titanium tetrachloride, zirconium chloride and zinc chloride. The corresponding sulfates may be exemplified by aluminum sulfate, ferric sulfate and zinc sulfate. The corresponding nitrates are illustrated by aluminum nitrate, ferric nitrate and zinc nitrate. The amount of catalyst required will vary, but will generally be in the range of about 0.005 to about 5% by weight based on the phenol-containing material being treated. A preferred range is from about 0.1 to about 1% by weight. The activity of the catalyst will to a certain extent determine the amount to be used, as will the length of time considered preferable to accomplish the desired result. Larger amounts of the less active catalysts will be needed, particularly when a comparatively short reaction period is needed from an operational standpoint. The catalytic treatment is desirably carried out for the length of time required to reach maximum content of alkyl-substituted benzofuran as determined by analysis.

The temperature of reaction may be anywhere from about 45° to about 200° C., a longer time being required at 45° C. than at higher temperatures in the range. A preferred temperature range is between about 100° and about 180° C. However, since it also may be preferred to operate under pressure, for example, 50 p.s.i., it is advantageous under such conditions to use temperatures as high as 190°–200° C. In general, as the temperature is increased, the rate of formation of 2-methylbenzofuran and other alkyl-substituted benzofurans also increases. This is illustrated by comparable runs carried out on identical samples of a phenol-containing material such as that used in Examples 8 and 9, namely, the bottoms product from steam distillation of a crude phenol fraction. In each instance there was used 0.5% by weight of ferric chloride based on the material treated, and after 24 hours at 108° C. the 2-MBF content was 275 p.p.m. After 23 hours at 120° C., the 2-MBF content was 513 p.p.m.

During the reaction period it may be desirable to have as little water present as is practical. Otherwise, it may be necessary to use a greater amount of catalyst than would be required under substantially anhydrous conditions, since water tends to decrease the activity of the catalysts. Factually, some of the catalysts, such as boron trifluoride and aluminum chloride, require anhydrous conditions. On the other hand, others such as ferric chloride and ferric sulfate are quite satisfactory in their activity with up to 15% water present based on the phenol-containing material treated. Accordingly, the steam distillation step of the process of this invention should ordinarily not be combined with the period of catalytic reaction. Subsequent to the latter, however, the fractional steam distillation step is applied, and it must be operated with sufficient efficiency that the alkyl-substituted benzofurans such as 2-methylbenzofuran are substantially removed from the predominantly phenol-containing material. It is preferred that after the steam distillation the phenol-containing material will contain an amount of alkyl-substituted benzofuran corresponding to a content of 2-methylbenzofuran not exceeding about 50 parts per million, corresponding approximately to a chlorination color of about 3.0 at 540 m$\mu$. The steam distillation also should substantially remove mesityl oxide. These objectives can be accomplished by carrying out the distillation continuously in an efficient column, for example, one having 20–40 plates, or in a comparable column using the modified inverted batch technique described in Example 1. Ordinary batch steam distillation is comparatively ineffective.

The phenol-containing material from the steam distillation step then is preferably subjected to fractional distillation in the absence of water to collect a purified material which is free or substantially free of compounds which boil higher than phenol and remain as undistilled residue. For example, if the purified phenol is that obtained by applying the process of this invention to the bottoms product from removal of acetone from the cleavage mixture, the undistilled residue will principally comprise acetophenone, dimethylphenylcarbinol, and cumylphenol. However, the purified phenol may contain, for example, some acetophenone and thus require further distillation to isolate a truly pure phenol. Some water also may be present, this also necessitating redistillation to remove last traces thereof so as to meet U.S.P. specifications in this respect. However, it is apparent that the phenol can be recovered, subsequent to the steam distillation step, by other procedures, such as extraction with aqueous alkali.

While the phenol to be purified by the process of this invention may contain from traces to comparatively large amounts of mesityl oxide, an alkyl-substituted benzofuran and one or more precursors of said alkyl-substituted benzofurans, the process is generally reserved for phenol containing no more precursor-type impurities and earlier formed alkyl-substituted benzofuran than will result in total alkyl-substituted benzofuran exceeding about 600 p.p.m. This maximum is based on economic factors rather than on effectiveness of the process and does not constitute a limitation to the process.

The applicability of the process of this invention has been shown with respect to various predominantly phenol-containing materials existing in the distillative recovery system which is applied to cumene hydroperoxide cleavage mixtures, and the use of ferric chloride, ferric sulfate and ferric nitrate as acidic catalysts has been illustrated. It should be additionally recognized, however, that these ferric salts can be formed at various points in the distillation system where iron or steel equipment is used, and that it may be unnecessary actually to add a catalyst to the phenol-containing material to be treated. For example, it was found that a stored phenol such as that used in Example 1 could be heat treated by batch distillation in a carbon steel pot at a temperature of 180° C. and then fractionally steam distilled by the inverted batch technique, and finally distilled once more to effect dehydration, and that the product phenol so obtained was entirely satisfactory with respect to color on chlorination. The amount of ferric salt formed by corrosion in process lines, storage tanks and distillation pots is often sufficient to catalyze the reaction between phenol and the alkyl-substituted benzofuran precursors whenever the phenol is subjected to heat treatment. By proper selection of temperature and length of treatment it is possible to effect substantially complete conversion to the alkyl-substituted benzofurans, which then are removed from the phenol by efficient fractional steam distillation.

The periodic table referred to in this specification and in the claims is that illustrated on pages 58 and 59 of Lange's Handbook of Chemistry, sixth edition, Handbook Publishers, Inc., Sandusky, Ohio, 1946. This is a reprint from H. G. Deming, Introductory College Chemistry, John Wiley and Sons, Inc.

This application constitutes a continuation-in-part of my application for United States Letters Patent, Serial No. 738,622, filed May 29, 1958, and now abandoned.

What I claim and desire to protect by Letters Patent is:

1. The method for the recovery of phenol from a cumene hydroperoxide cleavage mixture by fractional distillation, said mixture comprising phenol and acetone as principal components, which comprises subjecting said mixture to fractional distillation to remove acetone and then contacting in the liquid phase any substantially acetone-free, predominantly phenol-containing material, which material contains genetic impurities comprising mesityl oxide, an alkyl-substituted benzofuran, and at least one precursor of said alkyl-substituted benzofuran, under acidic conditions with an acidic catalyst selected from the group consisting of boron trifluoride and the halides, sulfates and nitrates of platinum and those heavy metals of groups II B, III A, IV, V A and VIII of the periodic table having an atomic number less than 52, at a temperature in the range of about 45° C. to about 200° C. until the precursor-type genetic impurity has substantially completely reacted with phenol and been converted to alkyl-substituted benzofuran, fractionally steam distilling the treated phenol-containing material until mesityl oxide and alkyl-substituted benzofuran have been substantially removed from said material and subsequently collecting a purified phenol-containing material.

2. The method of claim 1 in which the purified phenol-containing material is collected by fractional distillation in the absence of water to obtain a purified phenol fraction.

3. The method of claim 1 in which the temperature is between about 100° C. and about 180° C.

4. The method of claim 1 in which the catalyst is ferric chloride.

5. The method of claim 1 in which the catalyst is ferric sulfate.

6. The method of claim 1 in which the catalyst is aluminum chloride.

7. The method of claim 1 in which the catalyst is nickel chloride.

8. The method of claim 1 in which the catalyst is nickel sulfate.

References Cited in the file of this patent

UNITED STATES PATENTS

| 2,737,480 | Adams et al. | Mar. 6, 1956 |
| 2,757,209 | Joris | July 31, 1956 |
| 2,971,893 | Hood | Feb. 4, 1961 |
| 2,992,169 | Gregory et al. | July 11, 1961 |

FOREIGN PATENTS

| 1,231,070 | France | Sept. 26, 1960 |